(12) United States Patent
Flynn

(10) Patent No.: US 10,002,406 B2
(45) Date of Patent: Jun. 19, 2018

(54) CONSISTENT SPHERICAL PHOTO AND VIDEO ORIENTATION CORRECTION

(71) Applicant: Samsung Electronics Co., Ltd, Suwon-si (KR)

(72) Inventor: Thomas Flynn, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/284,477

(22) Filed: Oct. 3, 2016

(65) Prior Publication Data

US 2018/0096448 A1 Apr. 5, 2018

(51) Int. Cl.
*G06T 3/00* (2006.01)
*G06F 3/01* (2006.01)
(52) U.S. Cl.
CPC ............ *G06T 3/0006* (2013.01); *G06F 3/017* (2013.01)
(58) Field of Classification Search
None
See application file for complete search history.

(56) References Cited

U.S. PATENT DOCUMENTS

| | | |
|---|---|---|
| 6,731,284 B1 | 5/2004 | Oxaal |
| 7,382,399 B1 | 6/2008 | McCall et al. |
| 8,743,219 B1 | 6/2014 | Bledsoe |
| 2012/0092348 A1 | 4/2012 | McCutchen |
| 2014/0049601 A1* | 2/2014 | Pfeil .................. H04N 5/23238 348/36 |
| 2014/0132788 A1 | 5/2014 | Ramsay et al. |

FOREIGN PATENT DOCUMENTS

WO 2013021150 A1 2/2013

OTHER PUBLICATIONS

Houghton, J., "Levelling a Panorama Image With PTGUI," http://www.johnhpanos.com/levtut.htm, Feb. 2, 2010, 6 pages.
"Tutorial: Straightening a Panorama," PTGui (/), New House Internet Services, Rotterdam, The Netherlands, 2006, 2 pages.
International Search Report and Written Opinion for International Application No. PCT/KR2017/010871, dated Jan. 16, 2018. (9 pages).

* cited by examiner

*Primary Examiner* — Michelle Chin

(57) ABSTRACT

An electronic device, method, and computer readable medium for a consistent spherical photo and video orientation correction. The electronic device includes a memory and at least one processor. The at least one processor is operably connected to the memory. The at least one processor is configured to capture orientation information corresponding to a spherical frame. The at least one processor is also configured to reorient the spherical frame using the orientation information. The at least one processor is further configured to store the reoriented spherical frame.

20 Claims, 11 Drawing Sheets

CONSISTENT SPHERICAL PHOTO AND VIDEO ORIENTATION CORRECTION

TECHNICAL FIELD

This disclosure relates generally to spherical photography and videography. More specifically, this disclosure relates to a method and apparatus for consistent spherical photo and video orientation correction.

BACKGROUND

Virtual reality requires a spherical image or video for the user to be able to view the entire surroundings. Currently, a number of images are taken from a single vantage point and stitched together to create a spherical frame.

SUMMARY

This disclosure provides a method and apparatus for consistent spherical photo and video orientation.

In a first embodiment, an electronic device is provided for consistent spherical photo and video orientation. The electronic device includes a memory and at least one processor. The at least one processor is operably connected to the memory. The at least one processor is configured to orientation information corresponding to a spherical frame. The at least one processor is also configured to reorient the spherical frame using the orientation information. The at least one processor is further configured to store the reoriented spherical frame.

In a second embodiment, a method is provided for consistent spherical photo and video orientation. The method includes capturing orientation information corresponding to a spherical frame. The method also includes reorienting the spherical frame using the orientation information. The method further includes storing the reoriented spherical frame.

In a third embodiment, a non-transitory medium embodying a computer program is provided for consistent spherical photo and video orientation. The program code, when executed by at least one processor, causes the electronic device to capture orientation information corresponding to a spherical frame. The program code, when executed by at least one processor, also causes the electronic device to reorient the spherical frame using the orientation information. The program code, when executed by at least one processor, further causes the electronic device to store the reoriented spherical frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8F, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
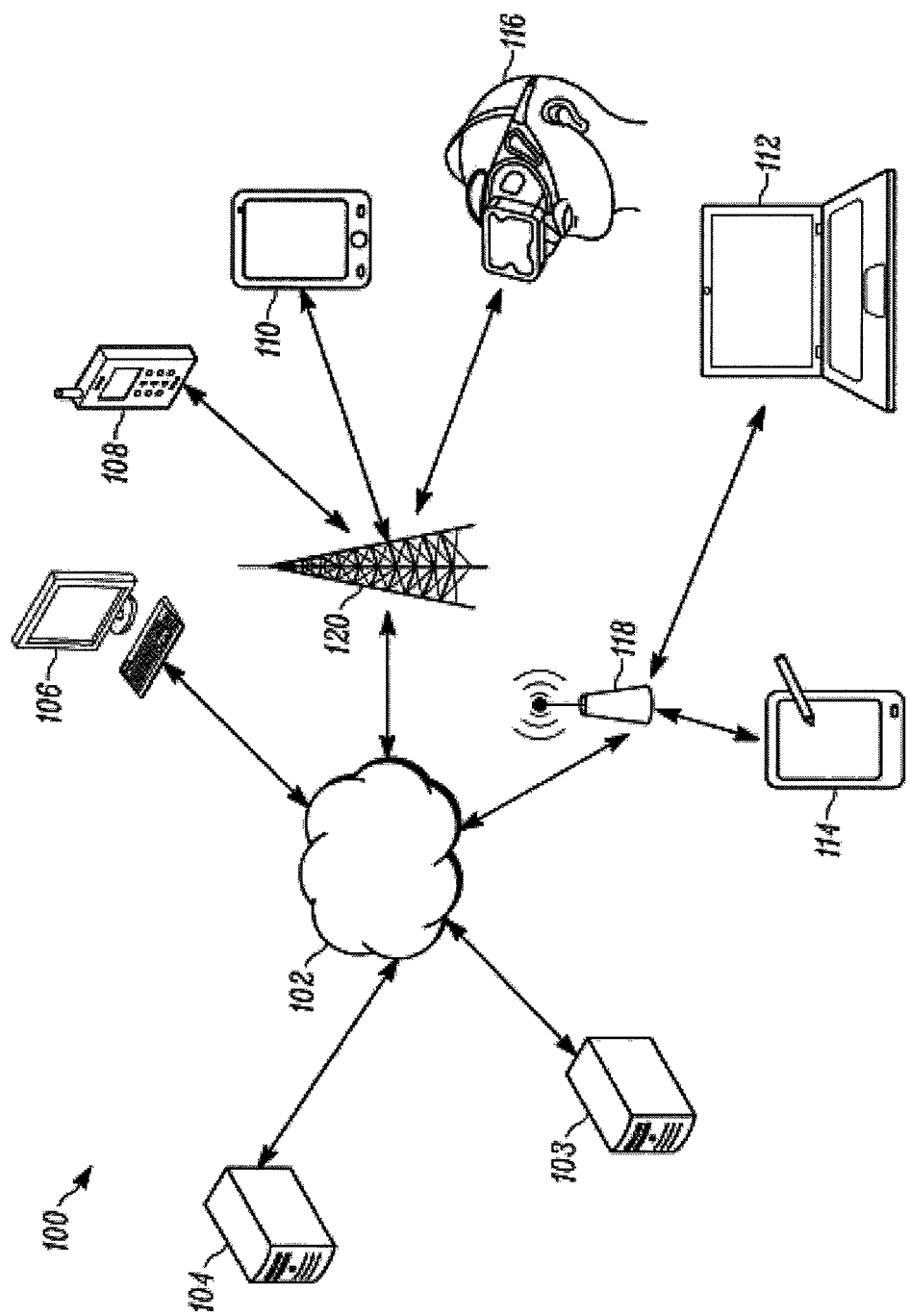
FIG. 1 illustrates an example communication system according to various embodiments of the present disclosure.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-116. Each server 104 includes any suitable computing or processing device that can provide computing services for one or more electronic devices. Each server 104 could, for example, include one or more processors, one or more memories storing instructions and data, and one or more network interfaces facilitating communication over the network 102.

Each electronic device 106-116 represents any suitable computing or communication device that interacts with at least one server or other computing device(s) over the network 102. In this example, the electronic devices 106-116 include electronic devices, such as, for example, a desktop computer 106, a mobile telephones or smartphones 108, a personal digital assistant (PDA) 110, a laptop computer 112, a tablet computer 114, a headset 116, a wearable device, smart watch, etc. However, any other or additional electronic devices could be used in the communication system 100.

In this example, some electronic devices 108-116 communicate indirectly with the network 102. For example, the electronic devices 108-110 and 116 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device could communicate directly with the network 102 or indirectly with the network 102 via any suitable intermediate device(s) or network(s).

As described in more detail below, when the electronic device 116 is processing a spherical frame from an image or video, the electronic device 116 performs consistent spherical photo or video orientation correction to the spherical frame.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
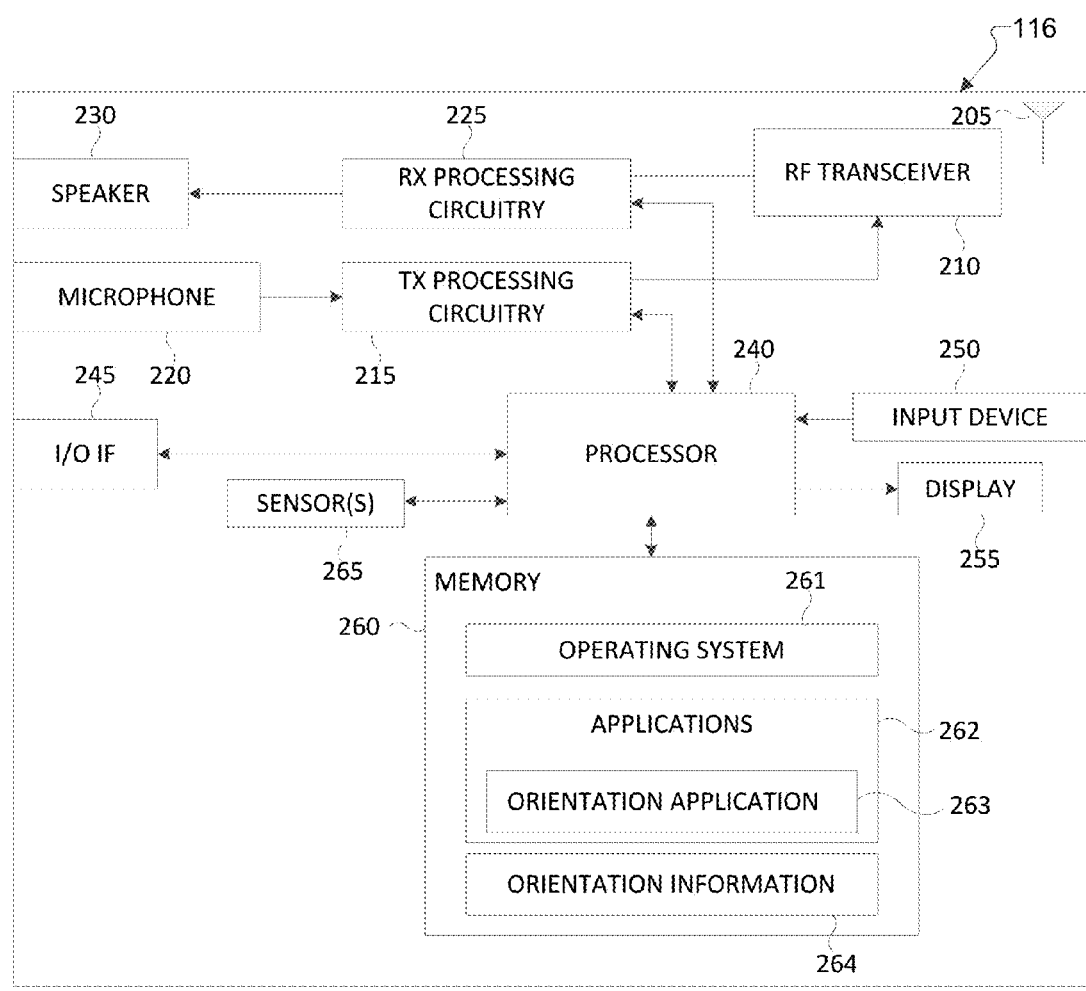
FIG. 2 illustrates an example electronic device according to various embodiments of the present disclosure.

FIG. 2 illustrates an example electronic device 116 in a communication system according to various embodiments of the present disclosure. The electronic device 116 could represent one or more of the electronic devices 106-116 in FIG. 1.

As shown in FIG. 2, the electronic device 116 includes an antenna 205, a radio frequency (RF) transceiver 210, transmit (TX) processing circuitry 215, a microphone 220, and receive (RX) processing circuitry 225. The electronic device 116 also includes a speaker 230, a processor 240, an input/output (I/O) interface (IF) 245, an input device 250, a display 255, and a memory 260. The memory 260 includes an operating system (OS) program 261 and one or more applications 262.

The RF transceiver 210 receives, from the antenna 205, an incoming RF signal transmitted by another component in a system. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors and execute the OS program 261 stored in the memory 260 in order to control the overall operation of the electronic device 200. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor 240 can execute an orientation application 263 for determining orientation based on details in the pictures themselves, for example, the horizon or other known elements such as smoke, bubbles, etc. The processor can store orientation information 264 corresponding to a plurality of frames or a spherical image or video. The orientation information 264 can include readings from different sensor 265 or can be received through the I/O interface 245 or the transceiver 210. The orientation information 264 is used to correctly orient the spherical image or video.

The processor 240 is also coupled to the I/O interface 245, which provides the electronic device 200 with the ability to connect to other devices such as laptop computers, handheld computers and other accessories, for example, a VR headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the input device 255. The operator of the electronic device 200 can use the input device 250 (e.g., keypad, touchscreen, button etc.) to enter data into the electronic device 200. The display 255 may be a liquid crystal display, a light-emitting diode (LED) display, an optical LED (OLED), an active matrix OLED (AMOLED), or other display capable of rendering text and/or at least limited graphics, such as from web sites.

The memory 260 is coupled to the processor 240. Part of the memory 260 could include a random access memory (RAM), and another part of the memory 260 could include a flash memory or other read-only memory (ROM).

Electronic device 116 further includes one or more sensors 265 that can meter a physical quantity or detect an activation state of the electronic device 116 and convert metered or detected information into an electrical signal. For example, sensor 265 may include one or more buttons for touch input, e.g., on the headset or the electronic device 116, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 265 can further include a control circuit for controlling at least one of the sensors included therein. The electronic device 116 can be used as a head mounted device (HMD). Any of these sensor(s) 265 may be located within the electronic device 116, within a headset configured to hold the electronic device 116, or in both the headset and electronic device 116, for example, in embodiments where the electronic device 116 includes a headset.

As described in more detail below, when the electronic device 116 is processing a spherical frame from an image or video, the electronic device 116 performs consistent spherical photo or video orientation correction to the spherical frame.

Although FIG. 2 illustrates an example of an electronic device in a communication system, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 200 configured as a mobile telephone or smartphone, electronic devices could be configured to operate as other types of mobile or stationary devices. In addition, as with computing and communication networks, electronic devices can come in a wide variety of configurations and FIG. 2 does not limit this disclosure to any particular electronic device.

Figure 3A:
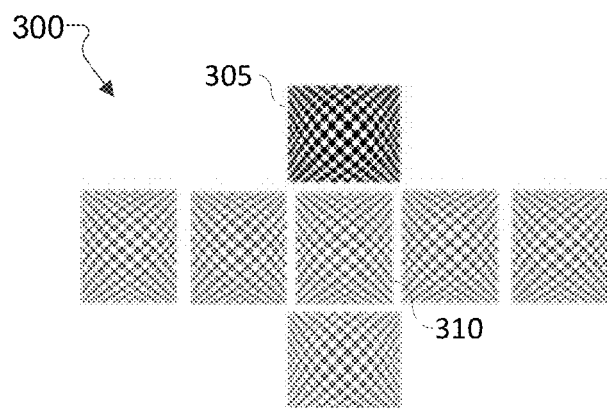
FIGS. 3A, 3B and 3C illustrate an example process for stitching a spherical frame to use in an electronic device according to various embodiments of the present disclosure.
Figure 3B:
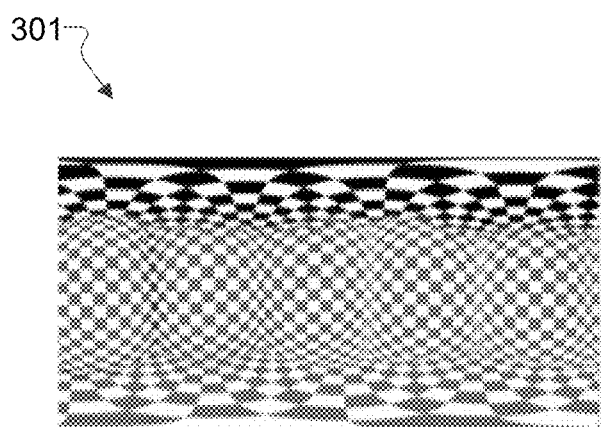
Figure 3C:
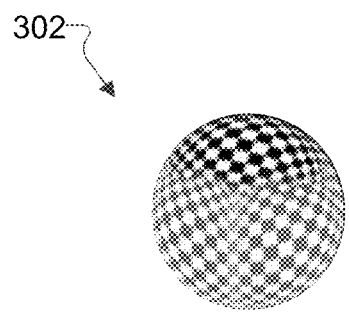

FIGS. 3A-3C illustrate an example process for stitching a spherical frame to use in an electronic device according to this disclosure. For example, the process depicted in FIG. 3 may be performed by electronic device 116 in FIG. 2; the process may also be implemented by electronic devices 106-116 in FIG. 1.

In FIG. 3A, the electronic device 116 receives a plurality of frames 305 for use as either a single image or a single video frame. The electronic device 116 can capture the plurality of frames 305 using a camera sensor 265 or a plurality of camera sensors 265. When the electronic device uses its own camera sensor 265 to capture the plurality of frames 305, the electronic device also captures data from other sensors, such as one or more accelerometers, one or more gyroscopes, one or more magnetometers, or any other type of sensor that can be used to determine orientation of a device or captured frame.

The electronic device 116 can also receive the plurality of frames 305 through the I/O interface 245 or through a transceiver 210. The plurality of frames 305 is stored in the memory 260 with corresponding orientation information 264 received. The orientation information 264 is captured in the device along with each of the plurality of frames.

In cases where the electronic device 116 includes a plurality of camera sensors 265, the orientation of the camera lens to the orientation of the orientation sensors is also captured. A relative orientation of each frame can be recorded based on electronic devices with multiple camera sensors in located on different parts of the electronic device 116 for capturing each side of the electronic device 116.

In certain embodiments, a primary frame 310 is indicated in the plurality of frames. The primary frame 310 can be a front facing frame. The primary frame 310 can also be used to determine the orientation of the spherical frame 302. The primary frame 310 can be a first frame taken or contain a subject to that the focus should be centered on.

In FIG. 3B, the frames are stitched together to create an equirectangular map 301. As with most flat representations of spherical objects, the further to the top and bottom from the center decreases the amount of accuracy of frame. Most of the important details of the frame are located away from the north pole and south pole of the spherical image 302, so any details reduced in the process of creating the spherical frame 302 are inconsequential.

In certain embodiments, the electronic device 116 can include fewer sensors than required for a suitable orientation reading. In these cases, the processor 240 can use a combination of the available sensors and software, such as an orientation application 263.

In certain embodiments, the electronic device 116 receives the plurality of frames 305 without any corresponding orientation information. In certain embodiments, the external device may not have any hardware for determining orientation. The electronic device 116 orients the spherical frame 302 solely based on an orientation application 263 or other software solutions.

The orientation application 263 can determine the horizon across the spherical frame 302 and adjust portions to straighten and level the horizon. In embodiment where the horizon is difficult to determine or incomplete, different landmarks can be identified and used instead. For example, in a heavily populated area, such as New York City, the horizon may blocked by buildings in every direction. The electronic device can detect different features in buildings, like a foundation, or different window treatments, etc. for determining the orientation.

In indoor embodiments, where the horizon is not visible, the orientation application 263 can use objects locations or other relevant features to determine gravity for a downward direction. In underwater embodiments, the orientation application 263 can use the direction bubbles or other objects to determine buoyancy for an upward direction. Other possible embodiments for software to determine orientation can include gas, clouds, precipitation, running water, etc.

Although FIGS. 3A-3C illustrate an example of process for stitching a spherical frame to use in an electronic device according to a functional mode of the electronic device, respectively, various changes could be made to FIG. 3. For example, while shown as a series of steps, various steps could overlap, occur in parallel, occur in a different order, or occur multiple times. Also, the functional modes chosen in FIG. 3 are for illustrations only, and more or less than the illustrated amount of frames can be implemented in the generation of the equirectangular map or the spherical frame.

Figure 4A:
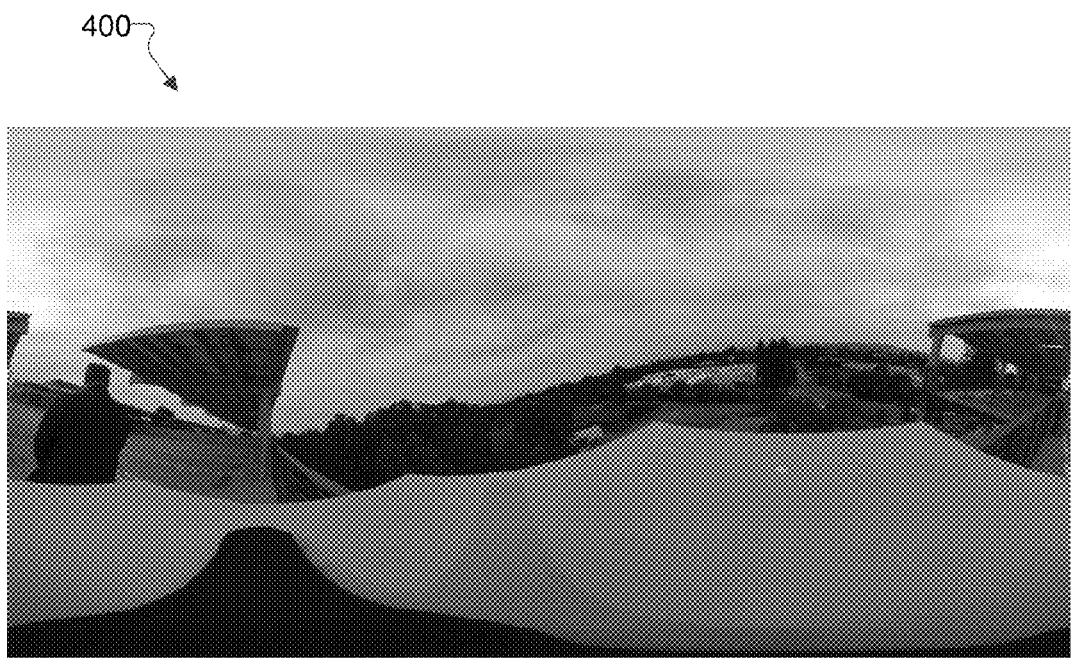
FIGS. 4A and 4B illustrate an example disoriented equirectangular map and a reoriented equirectangular map according to various embodiments of the present disclosure.
Figure 4B:

FIGS. 4A and 4B illustrate an example disoriented equirectangular map 400 and a reoriented equirectangular map 405 according to various embodiments of the present disclosure. For example, the process depicted in FIG. 4 may be performed by electronic device 116 in FIG. 2; the process may also be implemented by client devices 106-116 in FIG. 1.

The spherical photos and videos are recorded in the orientation of the camera sensors 265 during capture. When viewing several photos or videos, a person can become disoriented and experience discomfort because each photo or video creates a disoriented equirectangular map 400. Orienting the photos and videos will correct the disoriented equirectangular map 400 into a reoriented equirectangular map 405. The reoriented equirectangular map 405 has gravity in a downward direction compared to the spherical frame. The reoriented equirectangular map 405 aligns the horizon to be level and centered vertically.

Although FIGS. 4A and 4B illustrate an example disoriented equirectangular map and a reoriented equirectangular map, respectively, various changes could be made to FIG. 4.

Figure 5:
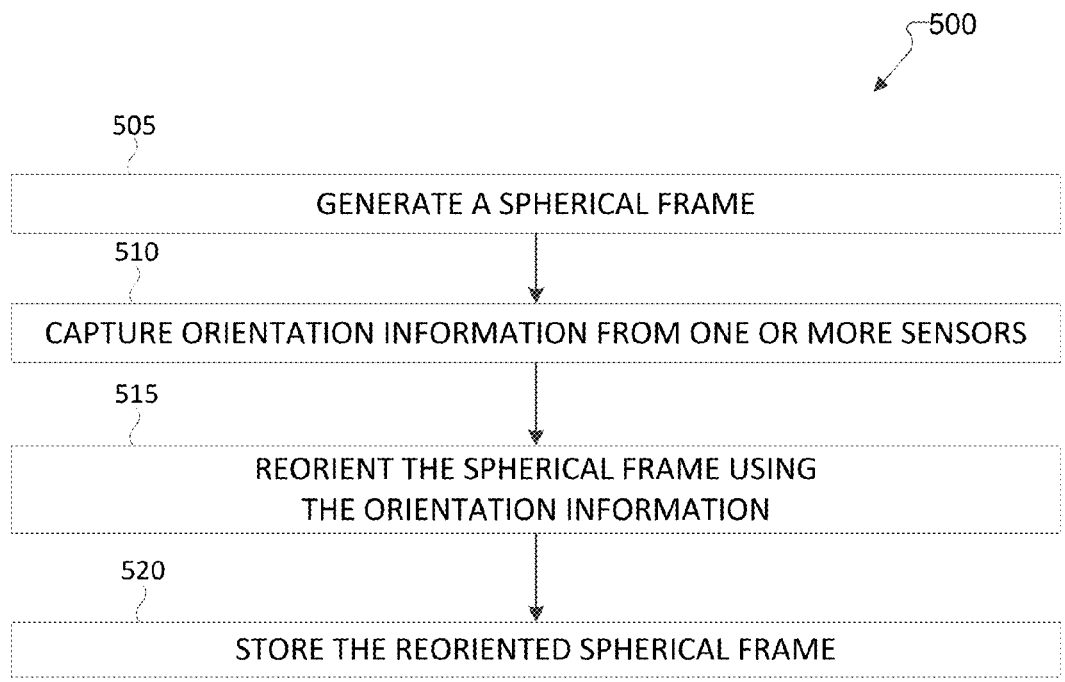
FIG. 5 illustrate an example process for consistent spherical photo and video orientation correction using one or more sensors according to various embodiments of the present disclosure.

FIG. 5 illustrates an example process 500 for consistent spherical photo and video orientation correction using one or more sensors 265 and FIGS. 7A-7E illustrate a graphical depiction of consistent spherical photo and video orientation correction using one or more sensors 265 according to various embodiments of the present disclosure. For example, the process depicted in FIG. 5 may be performed by electronic device 116 in FIG. 2; the process may also be implemented by electronic devices 106-116 in FIG. 1.

In operation 505, the electronic device 116 generates a spherical frame 705. The spherical frame 705 can be stitched together from a plurality of frames 305 or generated from an equirectangular map 700. In certain embodiments, the equirectangular map 700, plurality of frames 305 or the spherical frame 705 can be received from a second electronic device.

In operation 510, the electronic device 116 captures orientation information 264 from one or more sensors 265. The one or more sensors 265 can include an accelerometer, a gyroscope, a magnetometer, or any other hardware on the electronic device 116 that can be used to determine the orientation of each image. The captured orientation information 264 is captured and stored with the corresponding frames 305. The orientation information 264 can also include a designated focus for the image or video. The focus can be determined based on a primary camera sensor, selected by a user, or by any other method of determining a focus.

In operation 515, the electronic device 116 reorients the spherical frame 705 using the orientation information 264. For example, in operation 515, the orientation information 264 is applied to the spherical frame 710 for adjustments to align gravity in a downward direction. When the orientation information 264 includes a focus, the spherical frame 710 is also rotated for the focus to be the portion immediately viewed when a user begins to view the spherical image or video.

In certain embodiments, the current orientation of the electronic device 116 is used to determine the initial viewpoint of the spherical image or video. The electronic device can compare the current orientation information with the stored orientation information to align the current viewpoint of the user.

In operation 520, the electronic device 116 stores the reoriented spherical frame 715. The spherical frame 715 is stored in the memory 260 of the electronic device 116. The reoriented spherical frame 715 can also be stored as a reoriented equirectangular map 720.

Although FIG. 5 illustrates an example process 500 for consistent spherical photo and video orientation correction using one or more sensors, various changes may be made to FIG. 5. For example, while shown as a series of steps, various steps could overlap, occur in parallel, occur in a different order, occur multiple times, or not be performed in certain embodiments.

Figure 6:
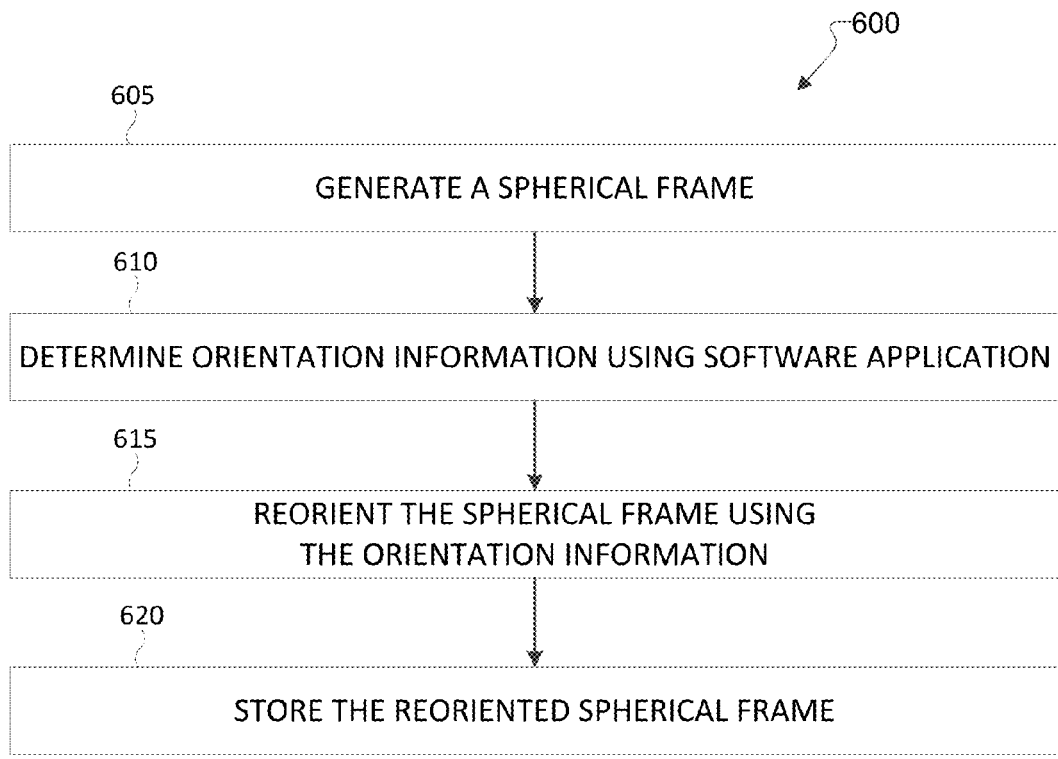
FIG. 6 illustrate an example process for consistent spherical photo and video orientation correction using an application according to various embodiments of the present disclosure.
Figure 7A:
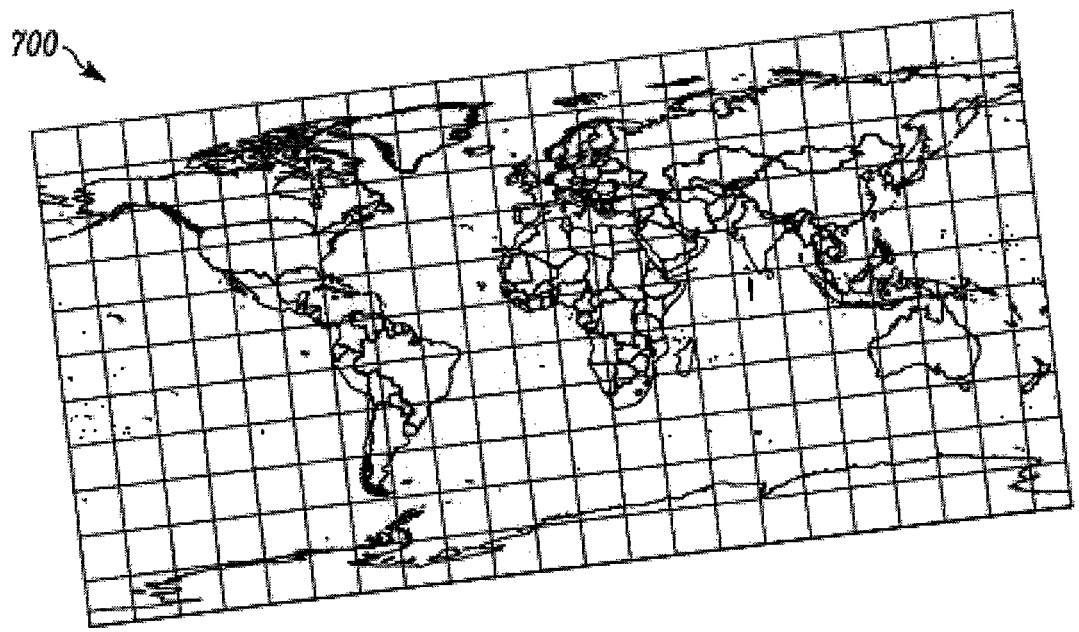
FIGS. 7A, 7B, 7C, 7D and 7E illustrate a graphical depiction of consistent spherical photo and video orientation correction using one or more sensors according to various embodiments of the present disclosure.
Figure 7B:
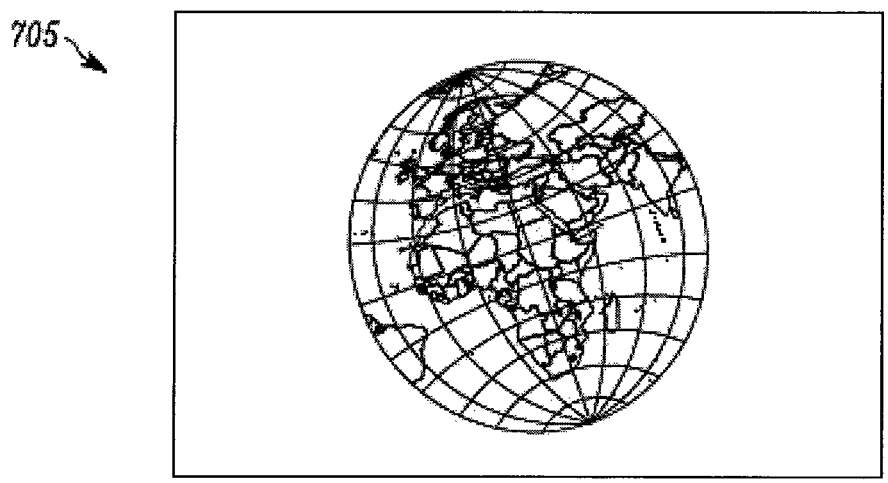
Figure 7C:
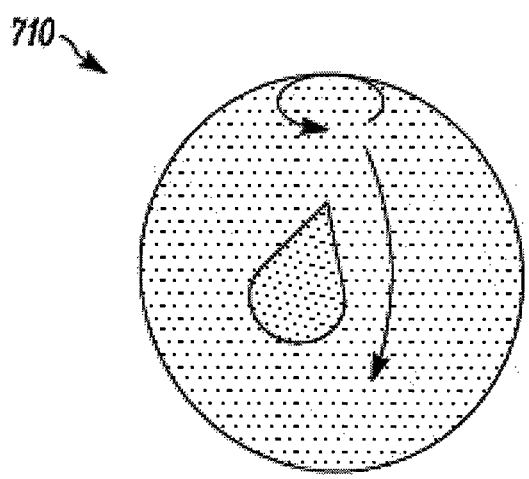
Figure 7D:
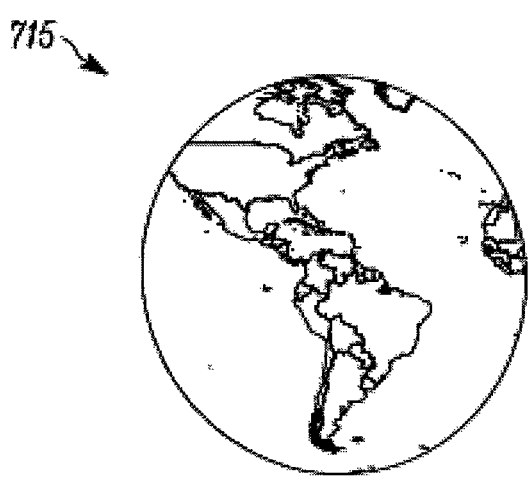
Figure 7E:
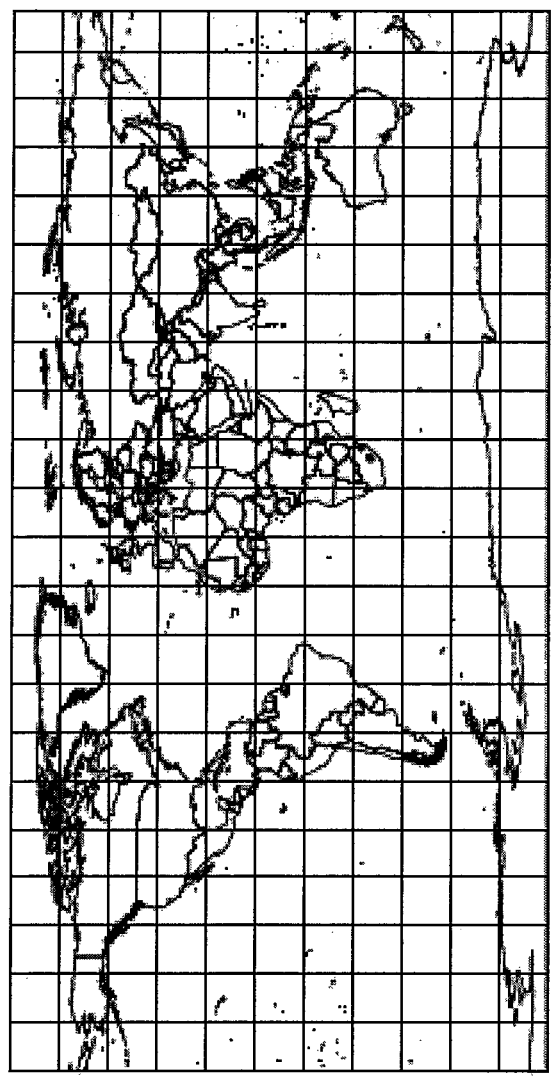
Figure 8A:
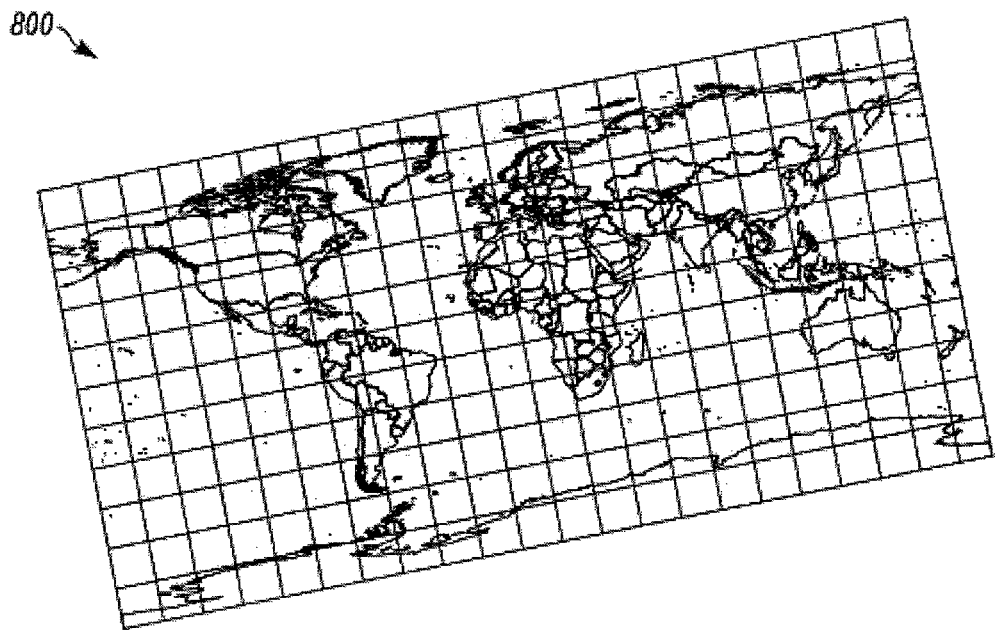
FIGS. 8A, 8B, 8C, 8D, 8E and 8F illustrate a graphical depiction of consistent spherical photo and video orientation correction using an application according to various embodiments of the present disclosure.
Figure 8B:
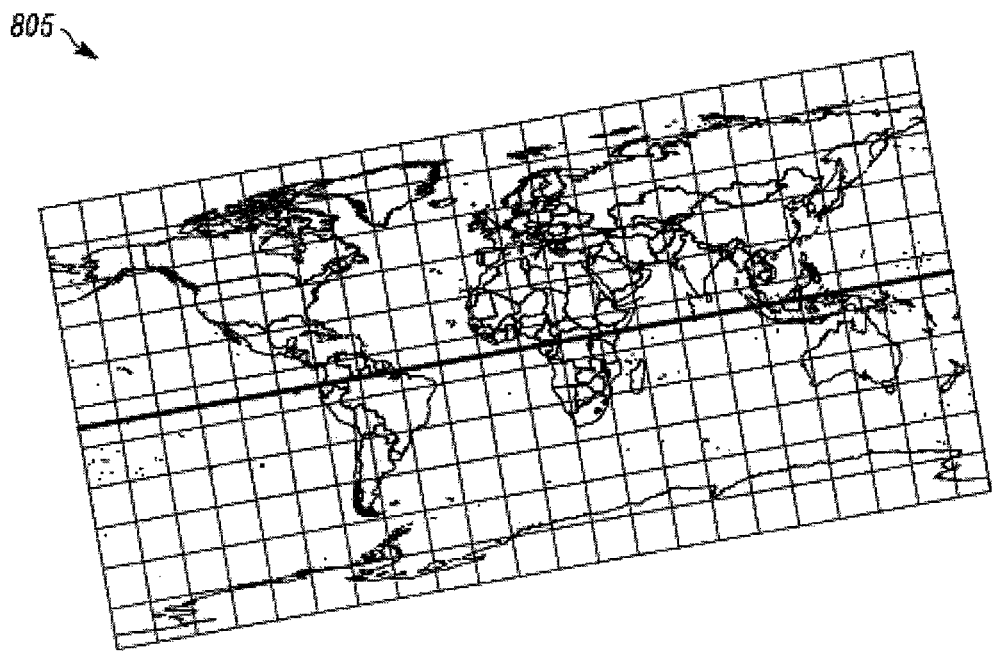
Figure 8C:
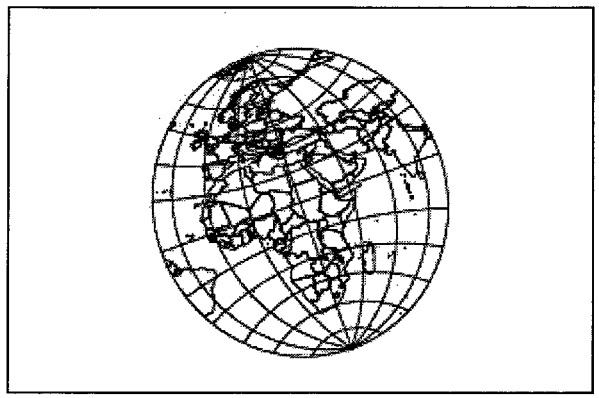
Figure 8D:
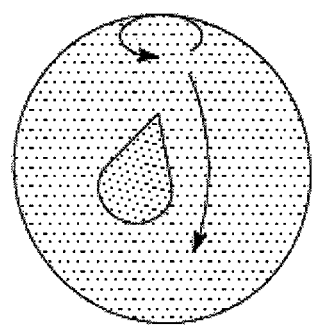
Figure 8E:
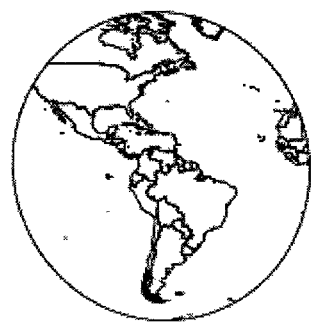
Figure 8F:
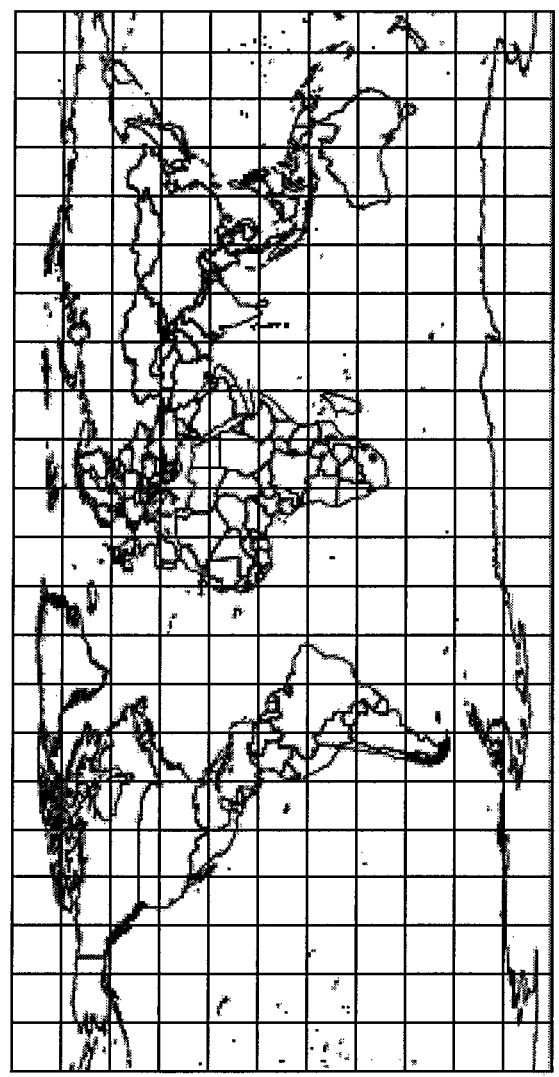

FIG. 6 illustrates an example process for consistent spherical photo and video orientation correction using an application and FIG. 8A-8F illustrate a graphical depiction of consistent spherical photo and video orientation correction using an application according to this disclosure. For example, the process depicted in FIGS. 6 and 8A-8F may be performed by electronic device 116 in FIG. 2; the process may also be implemented by electronic devices 106-116 in FIG. 1.

In operation 605, the electronic device 116 generates a spherical frame 810. The spherical frame 810 can be stitched together from a plurality of frames 305 or generated from an equirectangular map 800. In certain embodiments, the equirectangular map 800, plurality of frames 305 or the spherical frame 810 can be received from a second electronic device. The plurality of frames 305 are captured from each direction of a single vantage point.

In operation 610, the electronic device 116 captures orientation information 264 from an orientation application 263. The orientation application 263 locates a horizon or other distinguishing feature to determine the orientation of each image. Once the horizon is located, the spherical image can be adjusted so that the horizon is level and centered vertically. The captured orientation information 264 is captured and stored with the corresponding frames 305. The orientation information 264 can also include a designated focus for the spherical image or video. The focus can be determined based on a primary camera sensor, selected by a user, or by any other method of determining a focus.

In operation 615, the electronic device 116 reorients the spherical frame 810 using the orientation information 264. The orientation information 264 is applied to the spherical frame 710 for adjustments to align gravity in a downward direction. When the orientation information 264 includes a focus, the spherical frame 815 is also rotated for the focus to be the portion immediately viewed when a user begins to view the spherical image or video.

In certain embodiments, the current orientation of the electronic device 116 is used to determine the initial viewpoint of the spherical image or video. The electronic device can compare the current orientation information with the stored orientation information to align the current viewpoint of the user.

In operation 620, the electronic device 116 stores the reoriented spherical frame 820. The spherical frame 820 is stored in the memory 260 of the electronic device 116. The reoriented spherical frame 820 can also be stored as a reoriented equirectangular map 825.

Although FIG. 6 illustrates an example process for consistent spherical photo and video orientation correction using an application, respectively, various changes could be made to FIG. 6. For example, while shown as a series of steps, various steps could overlap, occur in parallel, occur in a different order, occur multiple times, or not be performed in certain embodiments.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
   a memory; and
   at least one processor coupled to the memory, the at least one processor configured to:
      capture orientation information corresponding to a spherical frame corresponding to a spherical image;
      determine the orientation information by locating a horizon of the spherical image in the spherical frame;
      reorient the spherical frame by adjusting the spherical frame to level the located horizon; and
      operate a display of the spherical image based on the reoriented spherical frame.

2. The electronic device of claim 1, wherein the as least one processor is further configured to:
   reorient the spherical frame by adjusting the horizon in the spherical frame to vertically center the located horizon.

3. The electronic device of claim 1, wherein the at least one processor is configured to:
   receive at least one input from one or more sensors indicating a direction of gravity relative to the spherical frame; and
   reorient the spherical frame based on the indicated direction of gravity.

4. The electronic device of claim 1, wherein the at least one processor is further configured to:
   capture a plurality of frames in each direction from a single vantage point; and
   stitch the plurality of frames together to generate the spherical frame.

5. The electronic device of claim 4, the at least one processor is configured to:
   designate a first frame of the plurality of frames as a forward direction; and
   orient the spherical frame to an initial view in the forward direction.

6. The electronic device of claim 1, wherein the at least one processor is further configured to reorient the spherical frame using a combination of at least one sensor and an analysis of distinguishable features discovered in the spherical frame.

7. The electronic device of claim 1, further comprising one or more sensors configured to capture the orientation information,
   wherein the one or more sensors comprises at least one of an accelerometer, a gyroscope, and a magnetometer.

8. A method for a consistent spherical frame orientation correction comprising:
   capturing orientation information corresponding to a spherical frame corresponding to a spherical image;
   determining the orientation information by locating a horizon of the spherical image in the spherical frame;
   reorienting the spherical frame by adjusting the spherical frame to level the located horizon; and
   operating a display of the spherical image based on the reoriented spherical frame.

9. The method of claim 8, further comprising:
   reorienting the spherical frame by adjusting the horizon in the spherical frame to vertically center the located horizon.

10. The method of claim 8, further comprising:
    receiving at least one input from one or more sensors indicating a direction of gravity relative to the spherical frame,
    wherein reorienting the spherical frame comprises reorienting the spherical frame based on the indicated direction of gravity.

11. The method of claim 8, further comprising:
    capturing a plurality of frames in each direction from a single vantage point; and
    stitching the plurality of frames together to generate the spherical frame.

12. The method of claim 11, further comprising:
    designating a first frame of the plurality of frames as a forward direction; and
    orienting the spherical frame to an initial view in the forward direction a first frame of the plurality of frames is designated as a forward direction for orienting the spherical frame.

13. The method of claim 8, wherein reorienting the spherical frame comprises orienting the spherical frame using a combination of at least one sensor and software.

14. The method of claim 8, further comprising:
    capturing the orientation information from one or more sensors, wherein the one or more sensors includes at least one of an accelerometer, a gyroscope, and a magnetometer.

15. A non-transitory computer readable medium embodying a computer program, the computer program comprising program code that, when executed by at least one processor, causes the at least one processor to:
    capture orientation information corresponding to a spherical frame corresponding to a spherical image;
    determine the orientation information by locating a horizon of the spherical image in the spherical frame;
    reorient the spherical frame by adjusting the spherical frame to level the located horizon; and
    operate a display of the spherical image based on the reoriented spherical frame.

16. The non-transitory computer readable medium of claim 15, wherein the computer program further comprises computer readable program code that, when executed by the at least one processor, causes the at least one processor to:

reorient the spherical frame by adjusting the horizon in the spherical frame to vertically center the located horizon.

17. The non-transitory computer readable medium of claim 15, wherein the computer program further comprises computer readable program code that, when executed by the at least one processor, causes the at least one processor to:
receive at least one input from one or more sensors indicating a direction of gravity relative to the spherical frame; and
reorient the spherical frame based on the indicated direction of gravity.

18. The non-transitory computer readable medium of claim 15, wherein the computer program further comprises computer readable program code that, when executed by the at least one processor, causes the at least one processor to:
capture a plurality of frames in each direction from a single vantage point; and
stitch the plurality of frames together to generate the spherical frame.

19. The non-transitory computer readable medium of claim 18, wherein the computer program further comprises computer readable program code that, when executed by the at least one processor, causes the at least one processor to:
designate a first frame of the plurality of frames as a forward direction; and
orient the spherical frame to an initial view in the forward direction.

20. The non-transitory computer readable medium of claim 15, wherein the computer program further comprises computer readable program code that, when executed by the at least one processor, causes the at least one processor to reorient the spherical frame using a combination of at least one sensor and an analysis of distinguishable features discovered in the spherical frame.

* * * * *